US011789899B2

(12) United States Patent
Liu et al.

(10) Patent No.: US 11,789,899 B2
(45) Date of Patent: Oct. 17, 2023

(54) HIGH-PERFORMANCE DATA LAKE SYSTEM AND DATA STORAGE METHOD

(71) Applicants: Nanhu Laboratory, Jiaxing (CN); Advanced Institute of Big Data, Beijing, Beijing (CN)

(72) Inventors: Hao Liu, Jiaxing (CN); Zhiling Chen, Jiaxing (CN); Tao Zhang, Jiaxing (CN); Peng Wang, Jiaxing (CN); Qiuye Wang, Jiaxing (CN); Chenxi Yu, Jiaxing (CN); Wei Chen, Jiaxing (CN); Yinlong Liu, Jiaxing (CN); Zhefeng Liu, Jiaxing (CN); Yonggang Tu, Jiaxing (CN)

(73) Assignees: Nanhu Laboratory, Jiaxing (CN); Advanced Institute of Big Data, Beijing, Beijing (CN)

( * ) Notice: Subject to any disclaimer, the term of this patent is extended or adjusted under 35 U.S.C. 154(b) by 0 days.

(21) Appl. No.: 17/988,834

(22) Filed: Nov. 17, 2022

(65) Prior Publication Data
US 2023/0153267 A1    May 18, 2023

(30) Foreign Application Priority Data
Nov. 18, 2021 (CN) .......................... 202111368382.X

(51) Int. Cl.
*G06F 16/11* (2019.01)
*G06F 3/06* (2006.01)
*G06F 16/13* (2019.01)

(52) U.S. Cl.
CPC ............ *G06F 16/116* (2019.01); *G06F 3/061* (2013.01); *G06F 16/134* (2019.01)

(58) Field of Classification Search
CPC ....... G06F 16/116; G06F 16/134; G06F 3/061
(Continued)

(56) References Cited

U.S. PATENT DOCUMENTS 8,032,701 B1 *  10/2011 Glade ................... G06F 3/0667
                                                     711/E12.007
11,057,635 B2 *  7/2021 Xiang ....................... G06T 7/20
(Continued)

FOREIGN PATENT DOCUMENTS

CN       106383886 A  *  2/2017 ......... G06F 16/2433
CN       109886074 A  *  6/2019
(Continued)

OTHER PUBLICATIONS

Office Action pertaining to corresponding Chinese Patent Application No. 202111368382.X, dated Dec. 24, 2021.
(Continued)

*Primary Examiner* — Phuong Thao Cao
(74) *Attorney, Agent, or Firm* — GRUMBLES LAW PLLC; Brittany Nanzig

(57) ABSTRACT

The present disclosure provides a high-performance data lake system and a data storage method. The data storage method includes the following steps: S1: converting a file into a file stream; S2: converting the file stream into an array in which multiple subarrays are nested; and S3: converting the array into a resilient distributed dataset (RDD), and storing the RDD to a storage layer of a data lake. The present disclosure provides a nested field structure, which lays the foundation for parallel processing in reading, and effectively improves read performance. Furthermore, the present disclosure flexibly generates a number of nested subarrays according to hardware cores, such that the data lake achieves better extension performance, and can keep optimal writing efficiency for different users.

10 Claims, 13 Drawing Sheets

(58) Field of Classification Search
USPC .......................................................... 707/602
See application file for complete search history.

(56) References Cited

U.S. PATENT DOCUMENTS

| | | | | |
|---|---|---|---|---|
| 11,063,612 | B1* | 7/2021 | Cyprus | H03M 13/2948 |
| 11,182,354 | B1* | 11/2021 | Patel | G06F 16/116 |
| 11,210,271 | B1* | 12/2021 | Vishnoi | G06F 11/0772 |
| 2009/0106299 | A1* | 4/2009 | Furusho | G06F 7/32 |
| | | | | 707/999.102 |
| 2014/0281349 | A1* | 9/2014 | Peters | G06F 9/5027 |
| | | | | 711/202 |
| 2018/0052898 | A1* | 2/2018 | Allan | G06F 16/435 |
| 2019/0026189 | A1* | 1/2019 | Kim | G06F 16/21 |
| 2019/0289311 | A1* | 9/2019 | Xiang | H04N 7/18 |
| 2019/0370599 | A1* | 12/2019 | C | G06F 16/338 |
| 2020/0174966 | A1* | 6/2020 | Szczepanik | G06F 16/13 |
| 2020/0394455 | A1* | 12/2020 | Lee | G06Q 40/08 |

FOREIGN PATENT DOCUMENTS

| | | | | | |
|---|---|---|---|---|---|
| CN | 110704193 | A | * | 1/2020 | G06F 17/15 |
| CN | 111291047 | A | * | 6/2020 | G06F 16/22 |
| CN | 111291047 | A | | 6/2020 | |
| CN | 106982356 | B | * | 12/2020 | H04L 67/10 |
| CN | 109889907 | B | * | 6/2021 | G06F 16/22 |
| CN | 114218595 | A | * | 3/2022 | G06F 17/15 |
| KR | 20200122900 | A | * | 10/2020 | |
| WO | WO-2019183062 | A1 | * | 9/2019 | G06F 40/58 |

OTHER PUBLICATIONS

Notice of Allowance corresponding Chinese Patent Application No. 202111368382.X, dated Jan. 13, 2022.

* cited by examiner

HIGH-PERFORMANCE DATA LAKE SYSTEM AND DATA STORAGE METHOD

CROSS REFERENCE TO RELATED APPLICATION

This patent application claims the benefit and priority of Chinese Patent Application No. 202111368382.X, filed with the China National Intellectual Property Administration on Nov. 18, 2021, the disclosure of which is incorporated by reference herein in its entirety as part of the present application.

TECHNICAL FIELD

The present disclosure belongs to the technical field of data read and write, and particularly relates to a high-performance data lake system and a data storage method.

BACKGROUND

A data lake is a large repository for storing various raw data of enterprises, in which the data are available for access, processing, analysis and transmission. In the data lake, different types of data are gathered together, and data can be analyzed without predefined models.

Files in the data lake are stored in a parquet format supported by the data lake. Specifically, as shown in FIG. 1, files to be written to the data lake are converted into a file stream with an application programming interface (API). The file stream is then converted into a byte array. The byte array is converted into a resilient distributed dataset (RDD). The RDD includes original data (byte array) and metadata (file names, sizes and so on) of the files. Through an underlying code of the data lake, the RDD is stored in the parquet format supported by the data lake. For existing data lake systems, as a file increases, a speed that the file is read from the lake is multiplied, which seriously affects read performance of the data lake.

For the above technical problem, there hasn't been any scheme that can effectively improve the read performance of the data lake. Numerous studies have found that one field can include multiple fields and correspond to multiple field types in some non-relational databases. However, when the file stream is converted into the array in the existing data lake, all fields only correspond to one field type. In view of this, improvements have been made to the field structure and significant effects have been achieved.

SUMMARY

In view of the above-mentioned problems, an objective of the present disclosure is to provide a high-performance data lake system.

In view of the above-mentioned problems, another objective of the present disclosure is to provide a data storage method capable of improving performance of the high-performance data lake system.

To achieve the above-mentioned objectives, the present disclosure employs the following technical solutions:

A data storage method of a data lake system includes the following steps:

S1: converting a file into a file stream;

S2: converting the file stream into an array in which multiple subarrays are nested; and S3: converting the array into an RDD, and storing the RDD to a storage layer of a data lake.

According to the data storage method of a data lake system, in step S2, 2-8 subarrays are nested in the array.

According to the data storage method of a data lake system, in step S2, a number of the subarrays nested in the array is the same as a number of central processing unit (CPU) cores in a current hardware environment.

According to the data storage method of a data lake system, the number of CPU cores in the current hardware environment is acquired by reading a configuration file, thereby dynamically determining a corresponding number of subarrays.

Between step S2 and step S3, the data storage method of a data lake system further includes:

detecting a size of a current array; storing the current array in a single row if the array size is less than a preset value; and segmenting, if the array size is greater than the preset value, the current array so as to store the current array in multiple rows, an array size on each of the rows being less than the preset value.

According to the data storage method of a data lake system, when the array size is greater than the preset value, there are n rows, n=m/s+1, where m represents the array size, s represents the preset value, and / represents a division operation to obtain a quotient.

According to the data storage method of a data lake system, after segmented into the multiple rows, the array having the size greater than the preset value is returned to an iterator including multiple RDD s.

The data storage method of a data lake system further includes a polling automatic storage method, specifically:

A1: monitoring a file by polling, acquiring absolute paths of all files under a specified path in each round of the polling, and placing the absolute paths into an array to serve as a latest offset;

A2: taking a result in a previous round of the polling, and acquiring a difference set between two arrays; and A3: acquiring an absolute path of a newly increased file in a current round of the polling according to the difference set, and storing the newly increased file to the data lake through steps S1-S3.

According to the data storage method of a data lake system, the system further performs buildReader and prepareWrite on the data lake system by inheriting a FileFormat type, such that the data lake system supports the buildReader and the prepareWrite.

A high-performance data lake system uses the above storage method for data storage.

The present disclosure has the following advantages:

The present disclosure provides a nested field structure, which lays the foundation for parallel processing in reading, and effectively improves read performance.

With a nested+multi-row storage manner, the present disclosure improves the storage capacity for a large file, and increases the upper storage limit.

With monitoring by polling, the present disclosure actively stores a newly increased file to the data lake, and processes a stream of the newly increased file, thereby improving storage performance of the data lake.

The present disclosure flexibly generates a number of nested subarrays according to hardware cores, such that the data lake achieves better extension performance, and can keep optimal writing efficiency for different users.

After segmented into multiple rows according to a specified size, an array is returned through an iterator rather than a list, which can effectively prevent the OutOfMemoryError.

DETAILED DESCRIPTION OF THE EMBODIMENTS

Figure 1:
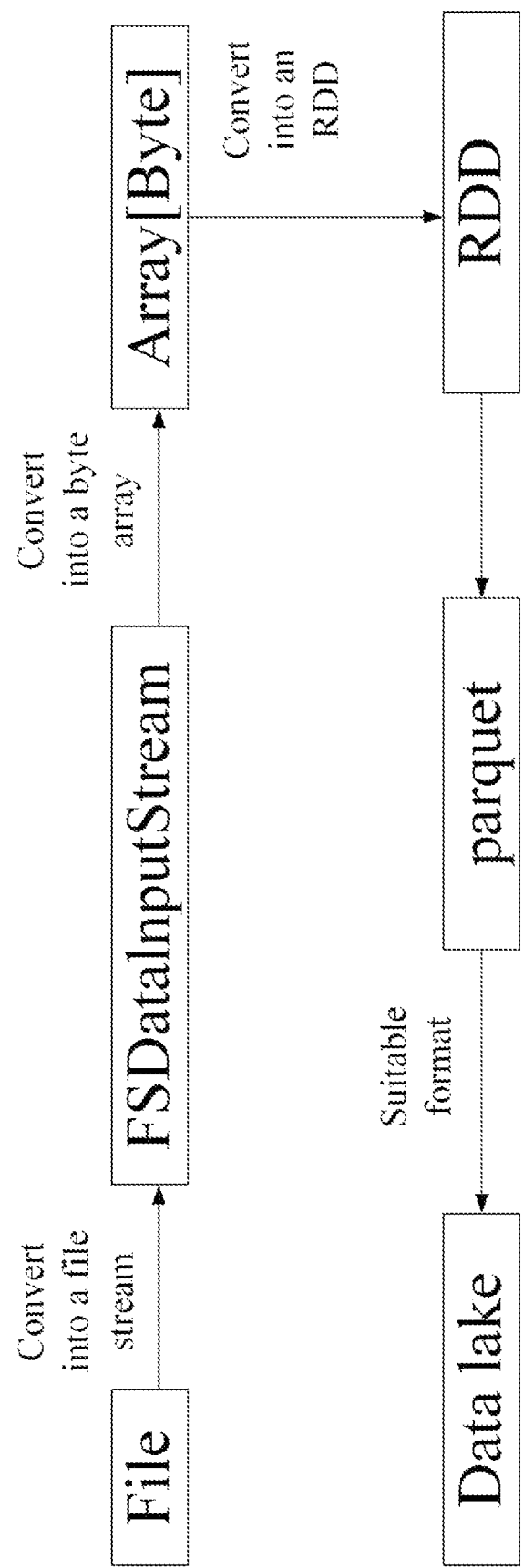
FIG. 1 is a flowchart illustrating writing of a file to a data lake.

The present disclosure will be further described in detail below with reference to the accompanying drawings and specific implementations.

An embodiment provides a data storage method of a data lake system, including the following steps:

S1: A file is converted into a file stream.

S2: The file stream is converted into an array in which multiple subarrays are nested.

S3: The array is converted into an RDD, and the RDD is stored to a storage layer of a data lake in a parquet format of the data lake.

Preferably, according to the present disclosure, a number of CPU cores in a current hardware environment is acquired by reading a configuration file, thereby dynamically determining a corresponding number of nested subarrays. Specifically, the file stream is converted into the array in which a number of nested subarrays is the same as the number of CPU cores in the current hardware environment. For example, the array into which the file stream is converted in a non-nested manner is [1,2,3,4,5,6,7,8]. If there are two CPU cores in the current hardware environment, the array into which the file stream is converted in a nested manner of the present disclosure includes two nested subarrays, namely [[1,2,3,4],[5,6,7,8]]. If there are four CPU cores in the current hardware environment, the array into which the file stream is converted in the nested manner of the present disclosure includes four nested subarrays, namely [[1,2],[3,4][5,6],[7,8]]. Cases with other numbers of cores are deduced by analogy. When the number of nested subarrays is the same as the number of CPU cores, a fastest read speed can be achieved. The number of nested subarrays can match with the number of CPU cores adaptively, thereby keeping the optimal read speed, and effectively improving read performance.

Preferably, between Step S2 and Step S3 in the embodiment, the data storage method of a data lake system further includes:

A size of a current array is detected. The current array is stored in a single row if the array size is less than a preset value. The current array is segmented if the array size is greater than the preset value, so as to store the current array in multiple rows, an array size on each of the rows being less than the preset value. When the array size is greater than the preset value, there are n rows, n=m/s+1, where m represents the array size, s represents the preset value, and / represents a division operation to obtain a quotient. If the array size is 50 Mb, and the preset value is 60 Mb, n=50/60+1=0+1=1.

If the array size is 100 Mb, and the preset value is 60 Mb, n=100/60+1=1+1=2. When the array is segmented into multiple rows, the front rows each have a size of the preset value, while the last row includes remaining bytes of the current array. Alternatively, the array size may also be distributed evenly to each row. Further, the array size may be distributed freely according to an actual condition of the array, for example, bytes belonging to a same subarray are placed into a same row preferably.

Further, after segmented into the multiple rows, the array having the size greater than the preset value is returned to an iterator including multiple RDDs. After segmented into the multiple rows according to a specified size, the array is returned through the iterator rather than a list, which can effectively prevent the OutOfMemoryError.

Further, the method further includes a polling automatic storage method. The polling automatic storage method is mainly intended to monitor whether a folder has a newly increased file by polling from a code level, and store the newly increased file to the data lake if yes. Specifically:

A1: In each round of the polling, absolute paths of all files under a specified path are acquired, and placed into an array to serve as a latest offset.

A2: A result in a previous round of the polling is taken, and a difference set between two arrays is acquired.

A3: An absolute path of a newly increased file in a current round of the polling is acquired according to the difference set, and the newly increased file is stored to the data lake through Steps S1-S3.

According to the present disclosure, the folder is monitored by polling, such that the newly increased file can be actively added to the data lake. After the data lake is connected to a data source, a polling automatic storage function for the data source is started. The newly increased file is not manually stored by the user, which meets actual service requirements, and further improves storage performance of the data lake.

Further, the method further performs buildReader and prepareWrite on the data lake system by inheriting a FileFormat type to realize buildReader and prepareWrite functions.

The buildReader is implemented same as that of the Spark Company, with the following difference: After the RDD is stored in the parquet format at a bottom of the data lake, the format in which the RDD is returned to the data lake is different. A single RDD is returned by the Spark, while multiple RDDs are included by multiple iterators. A small part of the RDDs is returned each time; and after a current part is processed by a computer, a next part is returned for processing, thereby effectively preventing the OutOfMemoryError.

The prepareWrite is implemented as follows: Multiple relevant arrays are acquired, and spliced into one array, and the array is output through an output stream.

An embodiment further provides a high-performance data lake system using the above-mentioned storage method for data storage.

In order to verify the superiority of the data storage method of the data lake system in the present disclosure, the data lake system using the data storage method in the present disclosure is experimentally compared with the existing data lake system using the common storage in terms of read and write:

Experimental Environment:

Hardware environment: Ii7 10th generation 8 cores, 116 G memory

Software environment: lhadoop pseudo-distributed storage, lubuntu 18.04

JVM environment, 1-Xms2048 m (initial stack), 1-Xmx4096 m (maximum stack)

A part of test data:

Single write/read test for different formatted files:

Text file (txt, pdf), video file (mp4), and compressed file (gz)

Real experimental data are used. There is no file randomly generated by the code. Each set of data is written and read for 3-5 times, and the average is taken as a result.

Some experimental results are as shown in FIGS. 2-13. FIGS. 2-5 illustrate experimental results of the existing data read-write lake system using common storage in terms of read and write in the prior art.

Figure 2:
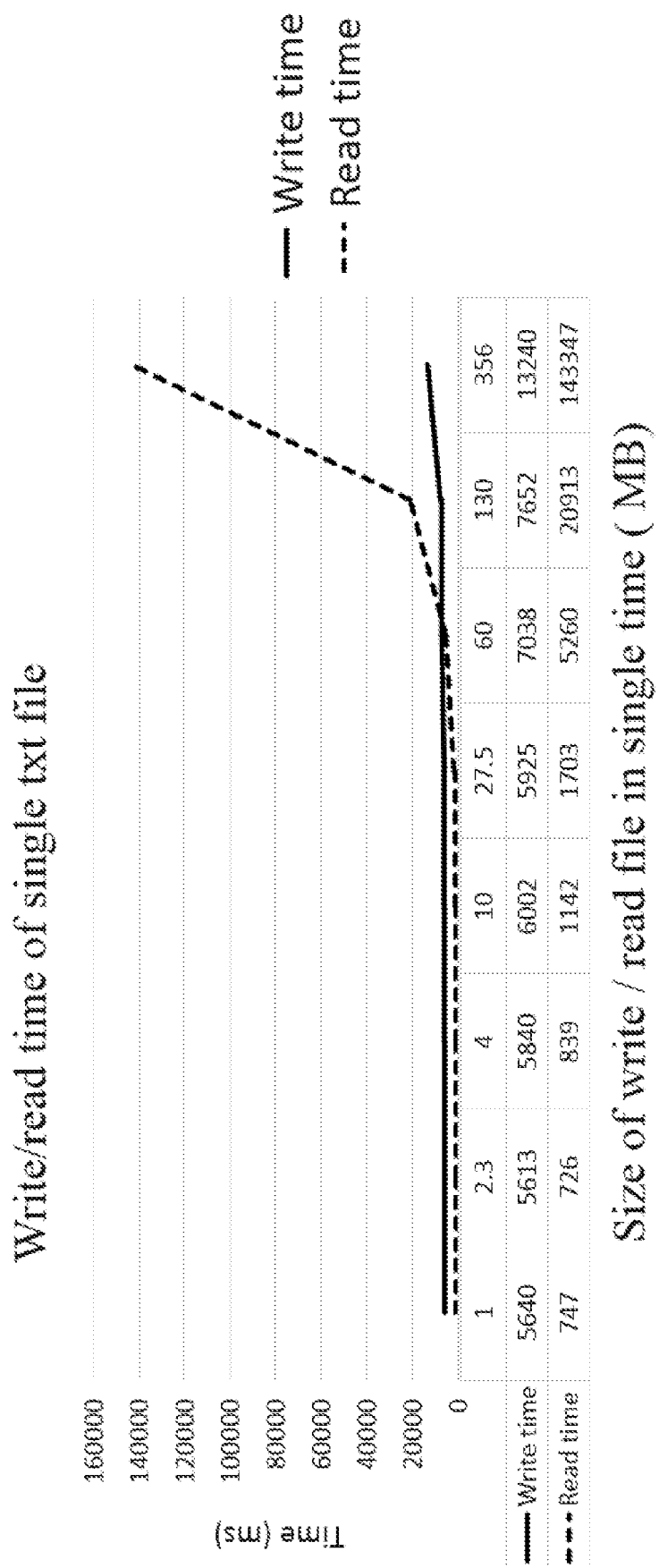
FIG. 2 illustrates an experimental result of write/read time of a single txt file in an existing data read-write lake system.

FIG. 2 illustrates write/read time of a single txt file. As can be seen, when there are 356 pieces in the write/read file, the read time is 143,347 ms, and the write time is 13,240 ms.

Figure 3:
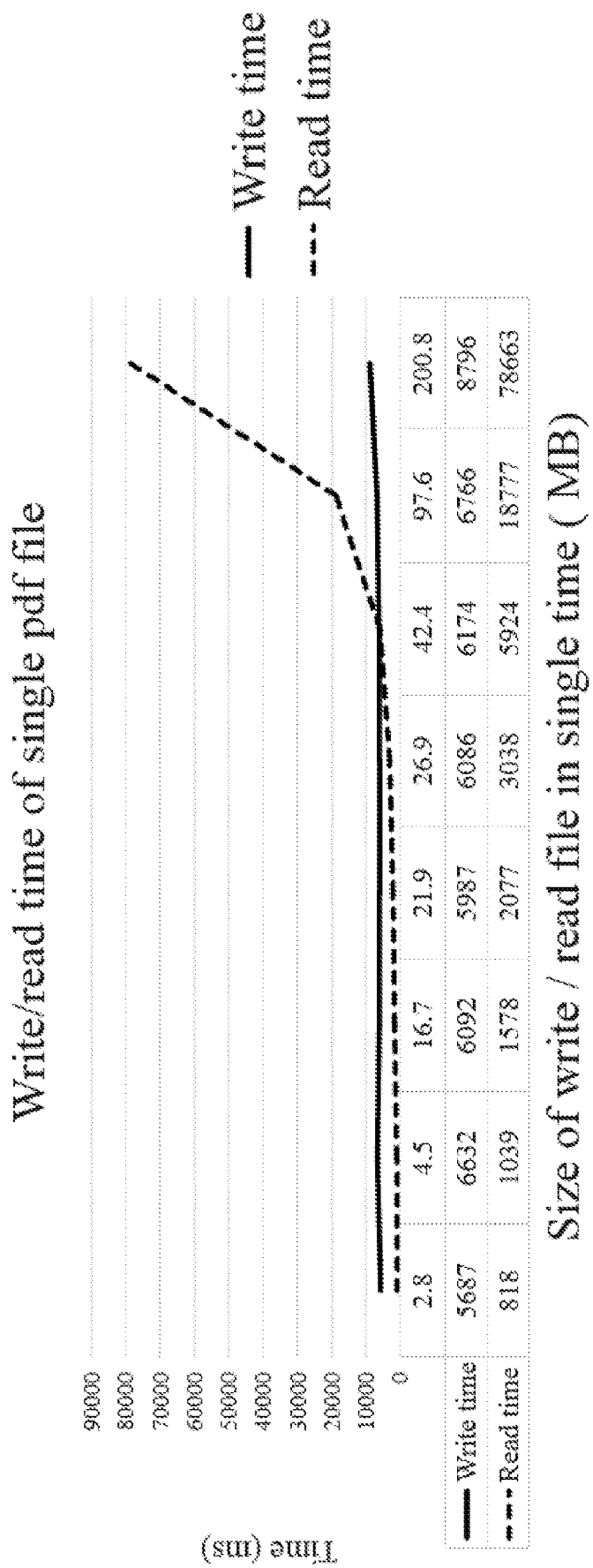
FIG. 3 illustrates an experimental result of write/read time of a single pdf file in an existing data read-write lake system.

FIG. 3 illustrates write/read time of a single pdf file. As can be seen, when the write/read file reaches 200.8 MB, the read time is 78,663 ms, and the write time is 8,796 ms.

Figure 4:
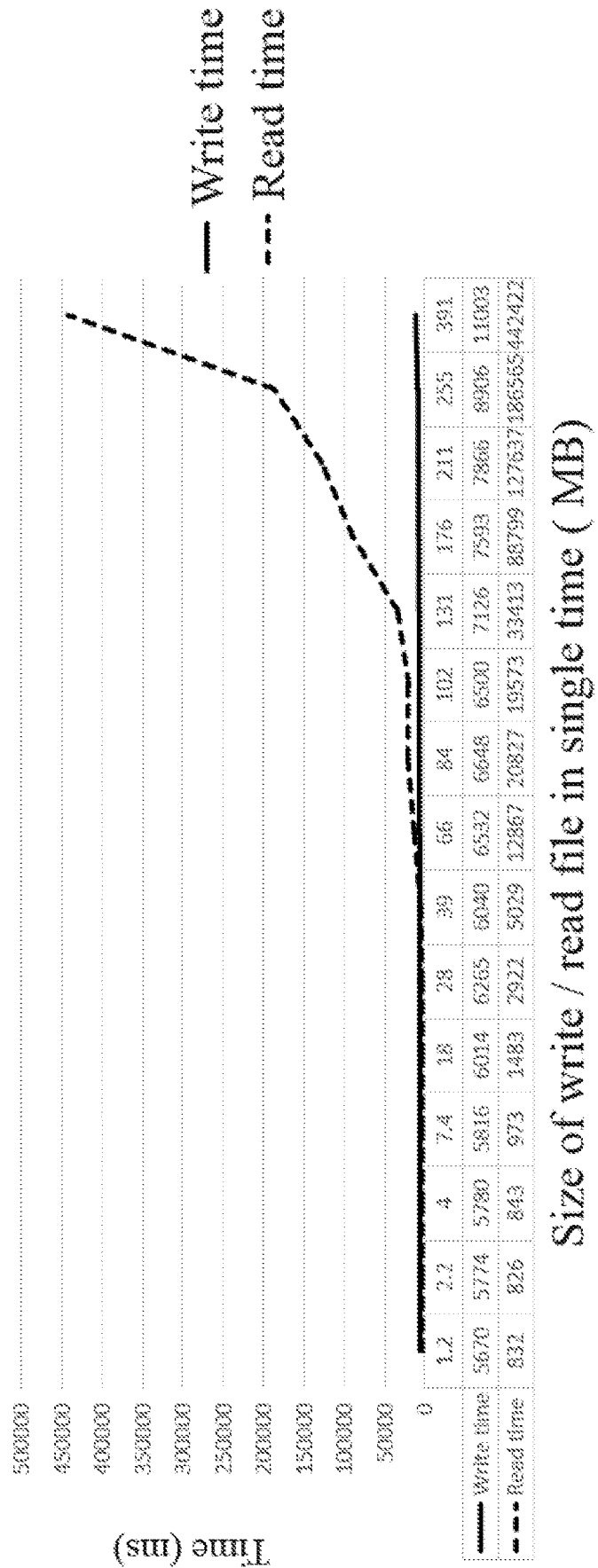
FIG. 4 illustrates an experimental result of write/read time of a single mp4 file in an existing data read-write lake system.

FIG. 4 illustrates write/read time of a single mp4 file. As can be seen, when the write/read file reaches 391 MB, the read time is 44,242 ms, and the write time is 11,003 ms.

Figure 5:
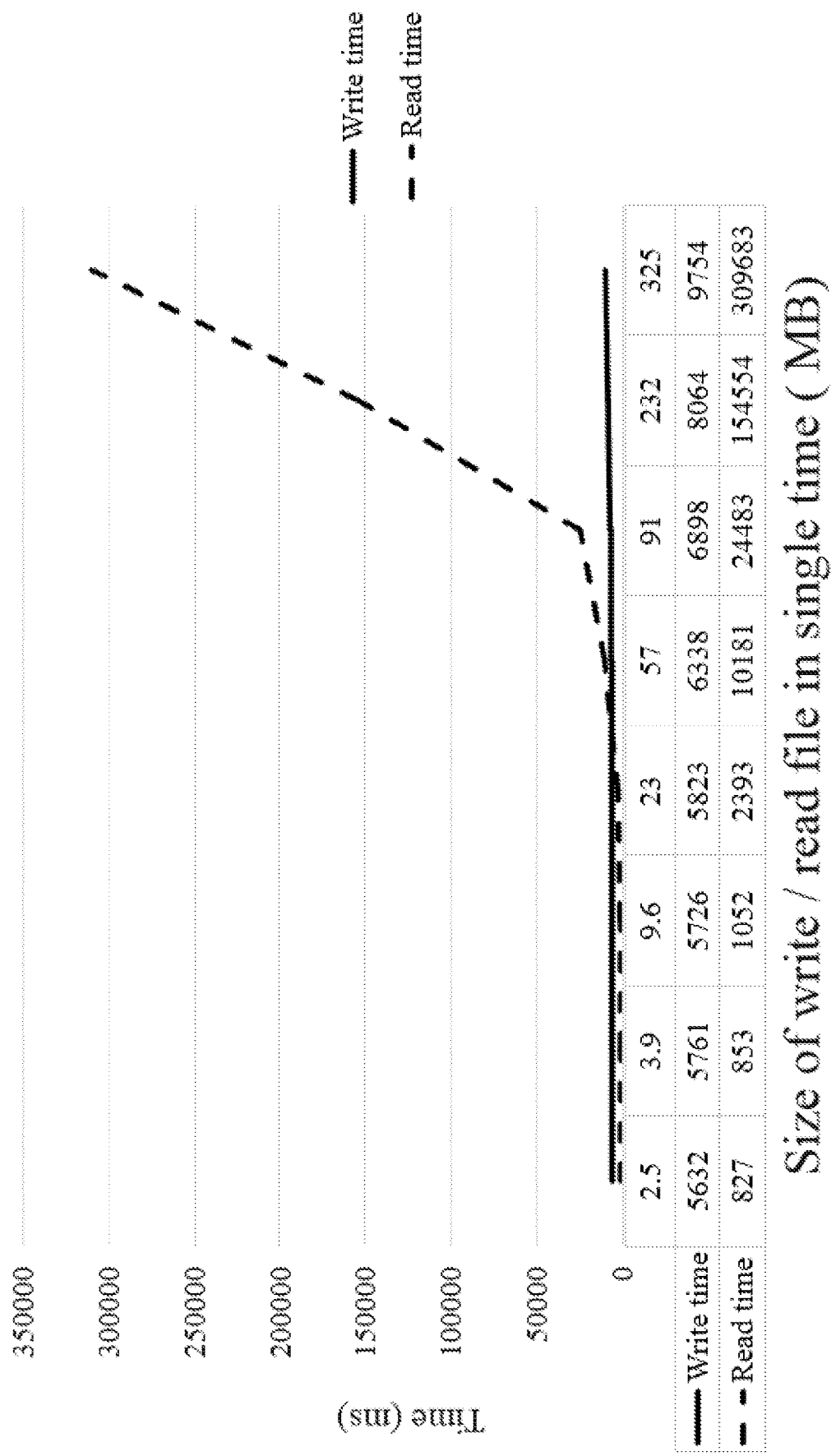
FIG. 5 illustrates an experimental result of write/read time of a single gz file in an existing data read-write lake system.

FIG. 5 illustrates write/read time of a single gz file. As can be seen, when the write/read file reaches 325 MB, the read time is 309,683 ms, and the write time is 9,754 ms.

FIGS. 6-13 illustrate experimental results of the data read-write lake system using the data storage method in the present disclosure in terms of read and write.

Figure 6:
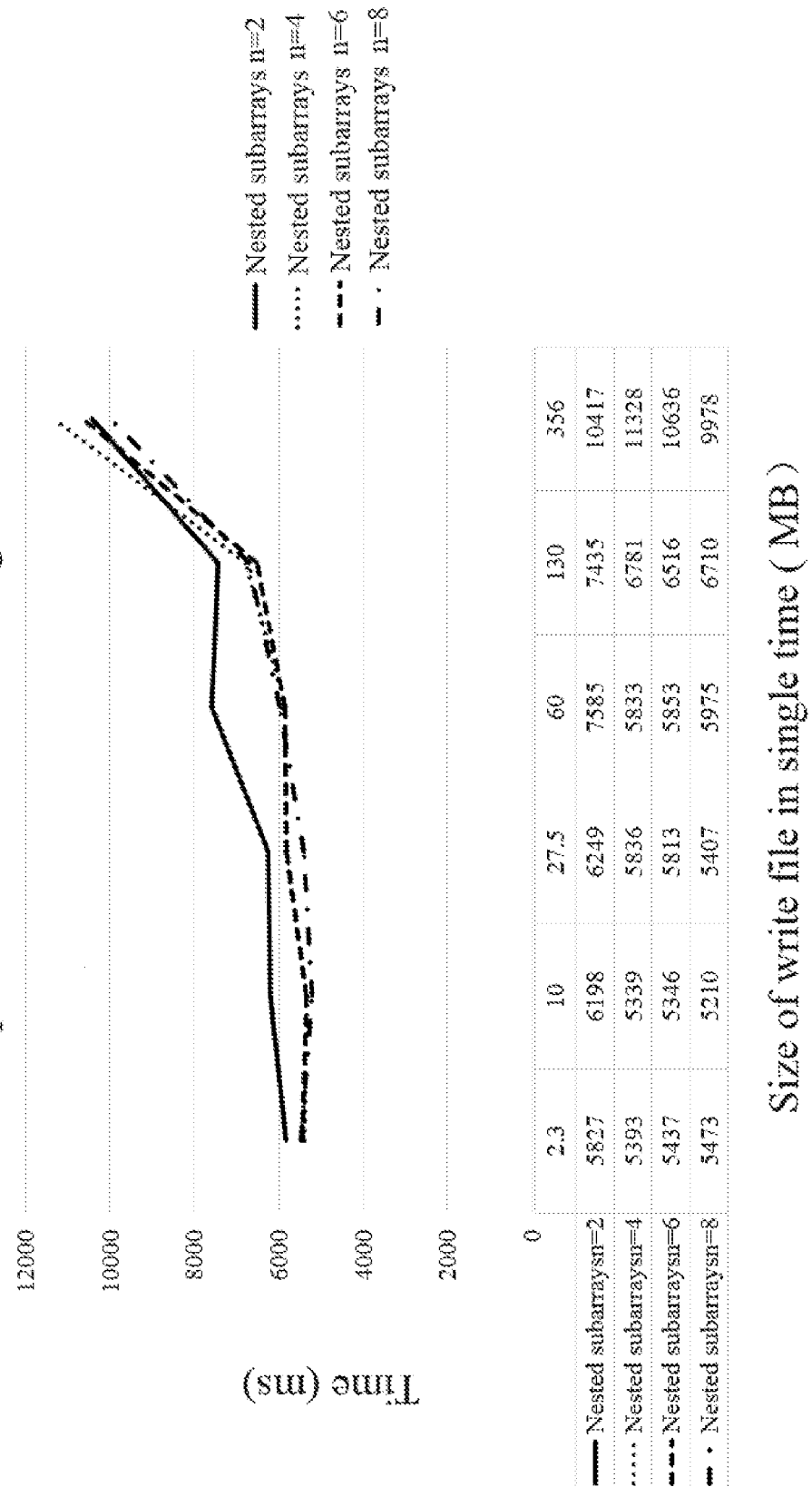
FIG. 6 illustrates an experimental result of write time of a single txt file in a data read-write lake system according to the present disclosure.

FIG. 6 illustrates write time of a single txt file. As can be seen, when there are 356 pieces in the write file, array structures in which 2, 4, 6 and 8 subarrays are nested respectively have write time of 10,417 ms, 11,328 ms, 10,636 ms, and 9,978 ms. Compared with FIG. 2, the write speed is slightly faster than that of the common data lake system.

Figure 7:
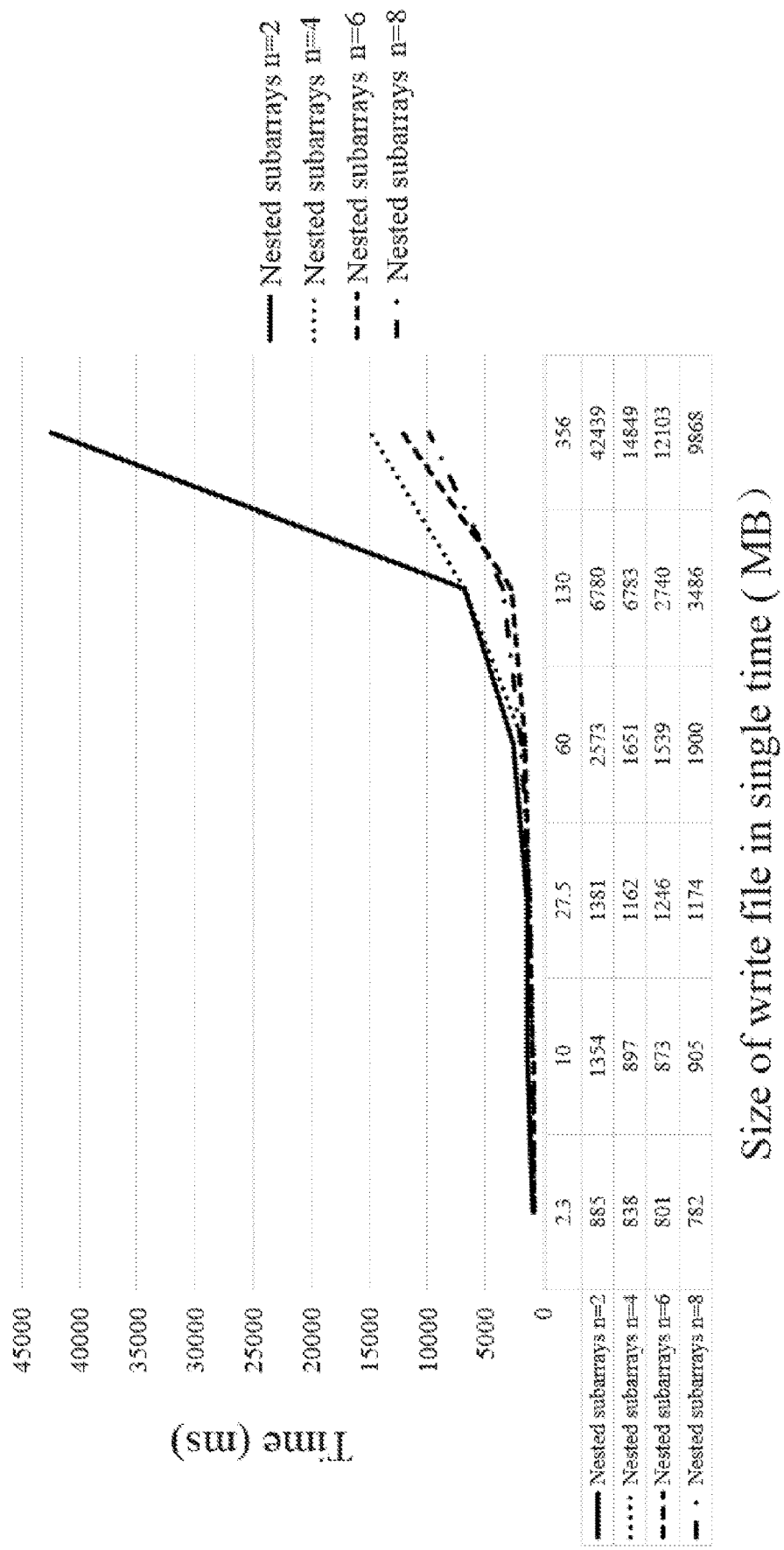
FIG. 7 illustrates an experimental result of read time of a single txt file in a data read-write lake system according to the present disclosure.

FIG. 7 illustrates read time of a single txt file. As can be seen, when there are 356 pieces in the read file, array structures in which 2, 4, 6 and 8 subarrays are nested respectively have read time of 42,439 ms, 14,849 ms, 12,103 ms, and 9,868 ms. Compared with FIG. 2, the read speed in each case is greatly improved over the common data lake system.

Figure 8:
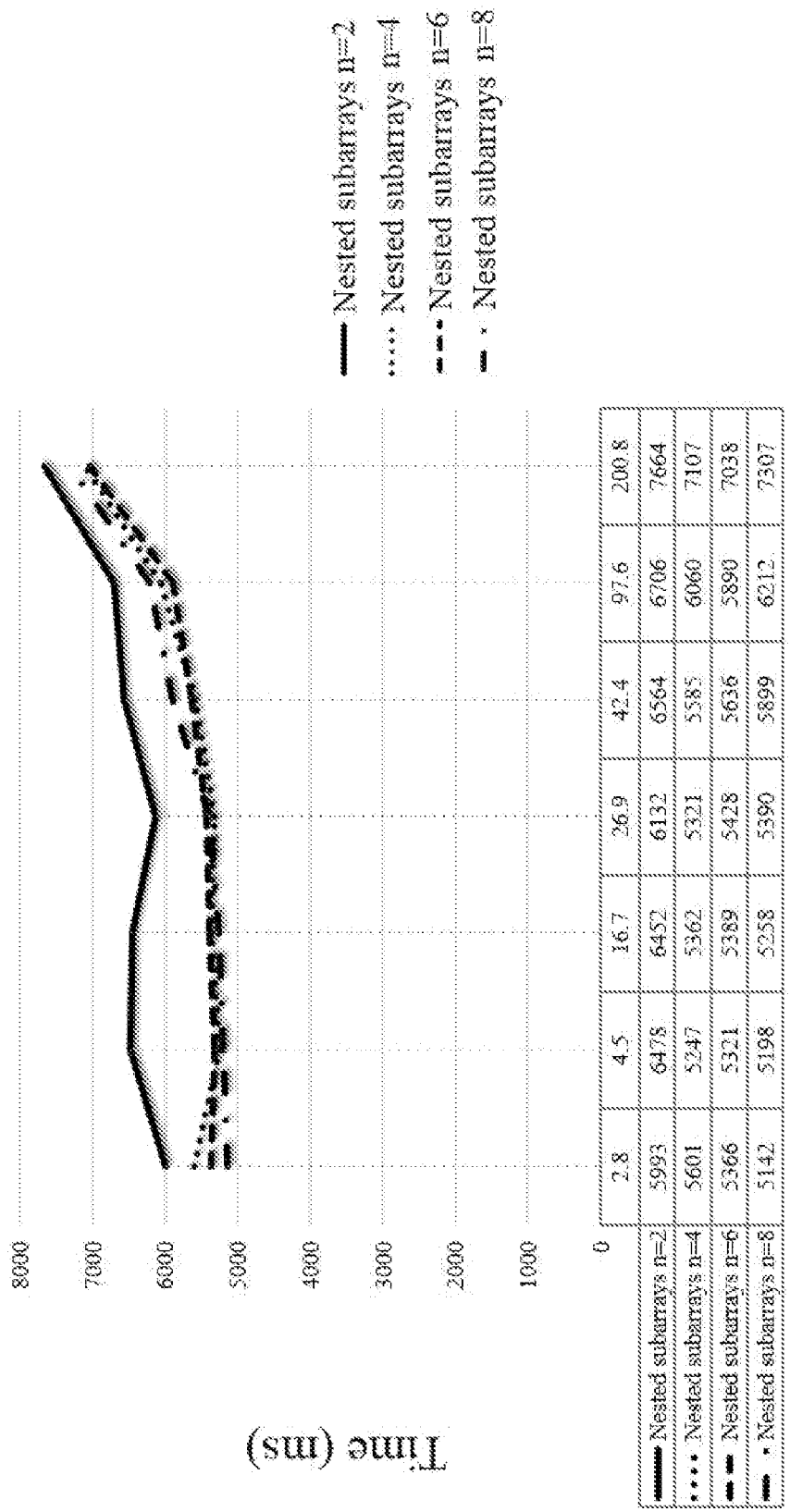
FIG. 8 illustrates an experimental result of write time of a single pdf file in a data read-write lake system according to the present disclosure.

FIG. 8 illustrates write time of a single pdf file. As can be seen, when the write file reaches 200.8 Mb, array structures in which 2, 4, 6 and 8 subarrays are nested respectively have write time of 7,664 ms, 77,107 ms, 7,038 ms, and 7,307 ms. Compared with FIG. 3, the write speed is slightly faster than that of the common data lake system.

Figure 9:
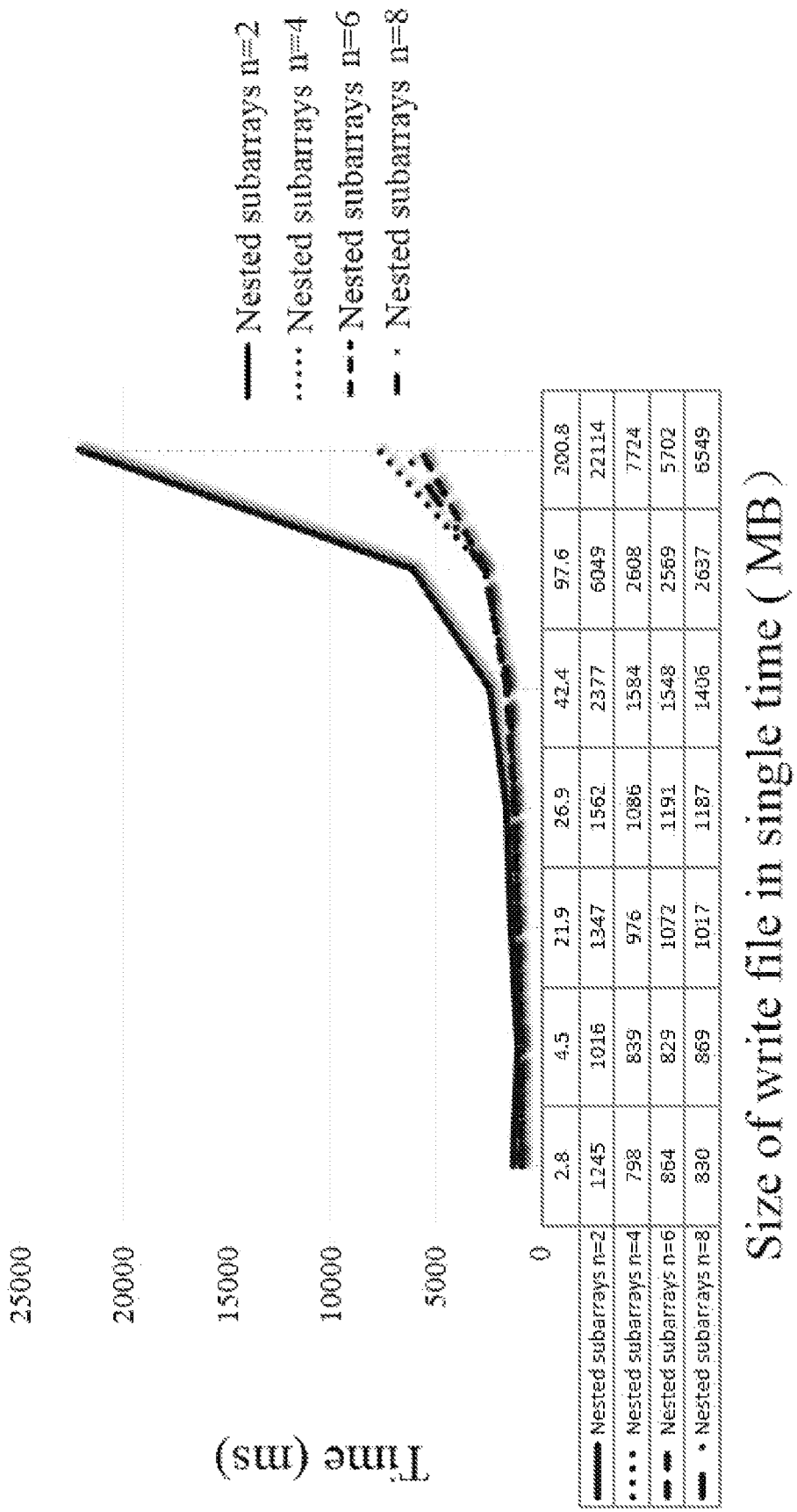
FIG. 9 illustrates an experimental result of read time of a single pdf file in a data read-write lake system according to the present disclosure.

FIG. 9 illustrates read time of a single pdf file. As can be seen, when the read file reaches 200.8 Mb, array structures in which 2, 4, 6 and 8 subarrays are nested respectively have read time of 22,114 ms, 7,724 ms, 5,702 ms, and 6,549 ms. Compared with FIG. 3, the read speed in each case is greatly improved over the common data lake system.

Figure 10:
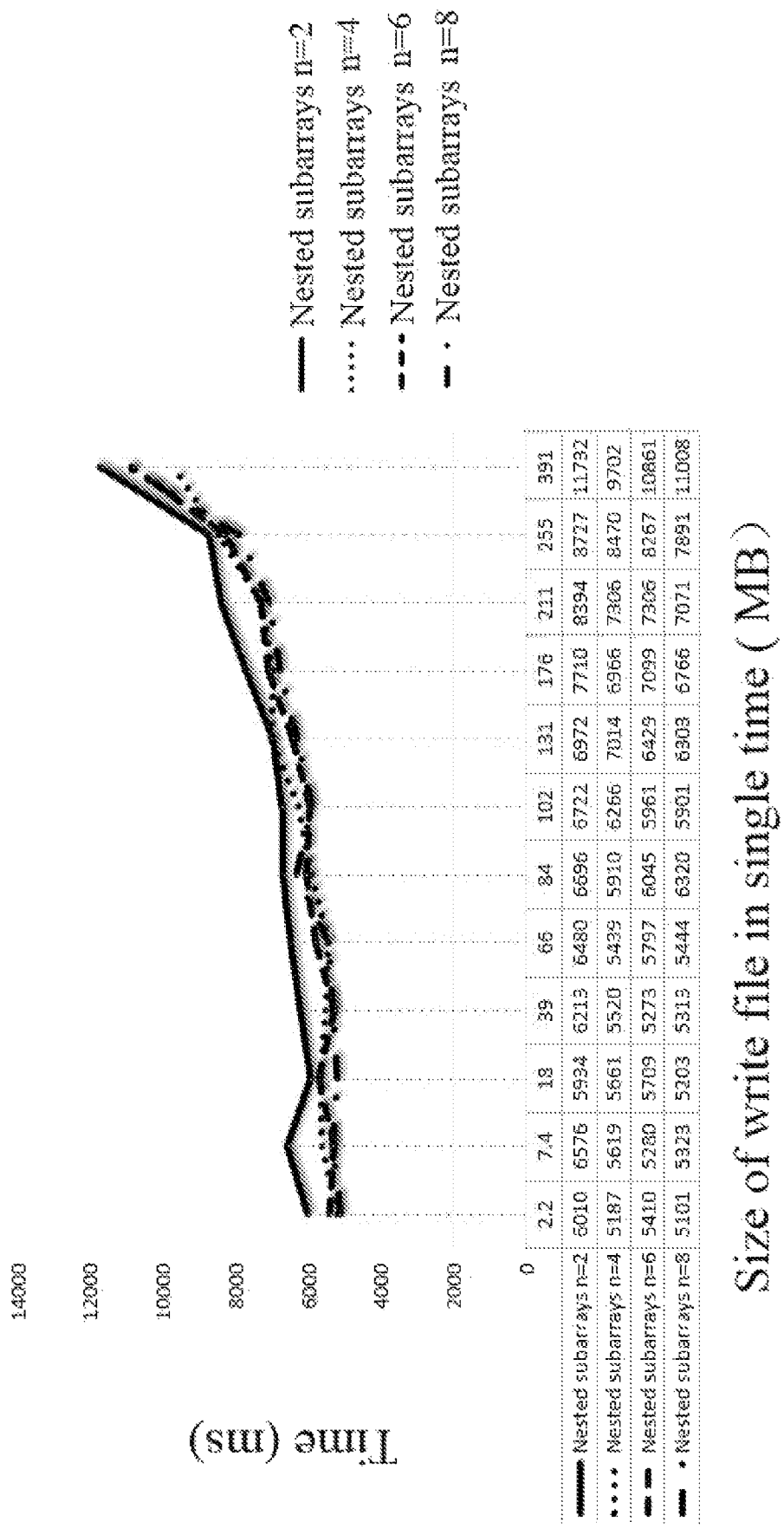
FIG. 10 illustrates an experimental result of write time of a single mp4 file in a data read-write lake system according to the present disclosure.

FIG. 10 illustrates write time of a single mp4 file. As can be seen, when the write file reaches 391 Mb, array structures in which 2, 4, 6 and 8 subarrays are nested respectively have write time of 11,732 ms, 9,702 ms, 10,861 ms, and 11,008 ms. Compared with FIG. 4, the write speed is close to that of the common data lake system.

Figure 11:
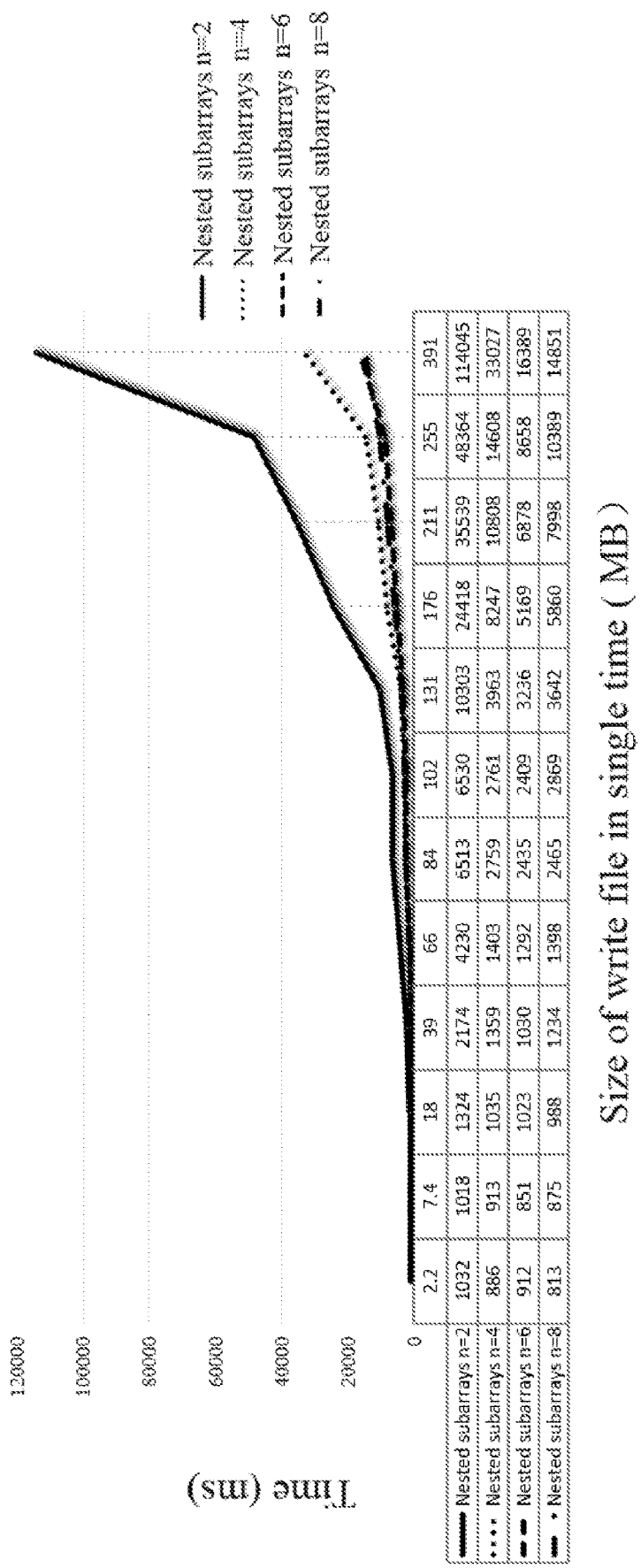
FIG. 11 illustrates an experimental result of read time of a single mp4 file in a data read-write lake system according to the present disclosure.

FIG. 11 illustrates read time of a single mp4 file. As can be seen, when the read file reaches 391 Mb, array structures in which 2, 4, 6 and 8 subarrays are nested respectively have read time of 114,045 ms, 33,027 ms, 16,389 ms, and 14,851 ms. Compared with FIG. 4, the array structure in which 2 subarrays are nested has the read speed slower than that of the common data lake system. The array structures in which 4, 6 and 8 subarrays are nested each have the read speed faster than that of the common data lake system. Particularly, the array structure in which 8 subarrays are nested has the read speed obviously faster than that of the common data lake system.

Figure 12:
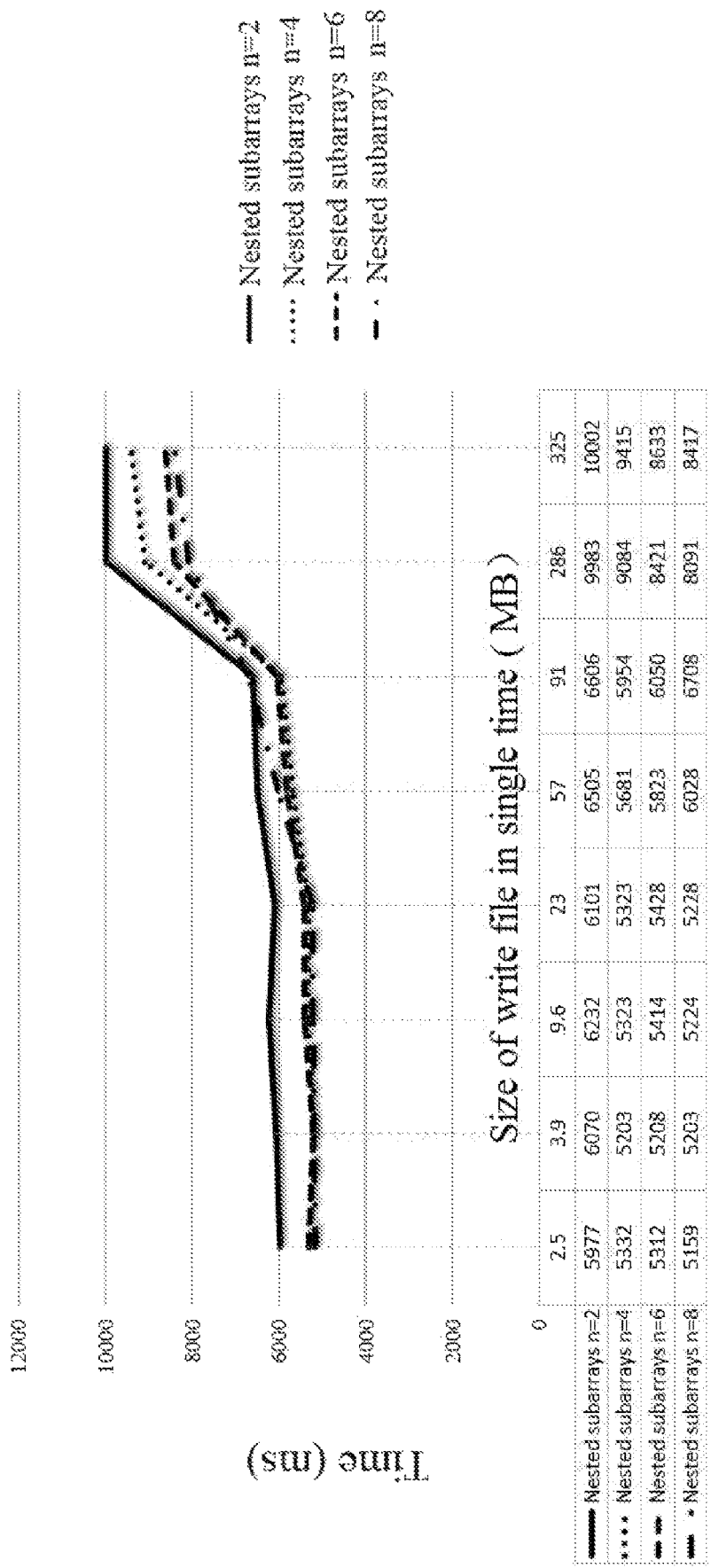
FIG. 12 illustrates an experimental result of write time of a single gz file in a data read-write lake system according to the present disclosure.

FIG. 12 illustrates write time of a single gz file. As can be seen, when the write file reaches 325 Mb, array structures in which 2, 4, 6 and 8 subarrays are nested respectively have write time of 10,002 ms, 9,415 ms, 8,633 ms, and 8,417 ms. Compared with FIG. 5, the write speed is close to that of the common data lake system.

Figure 13:
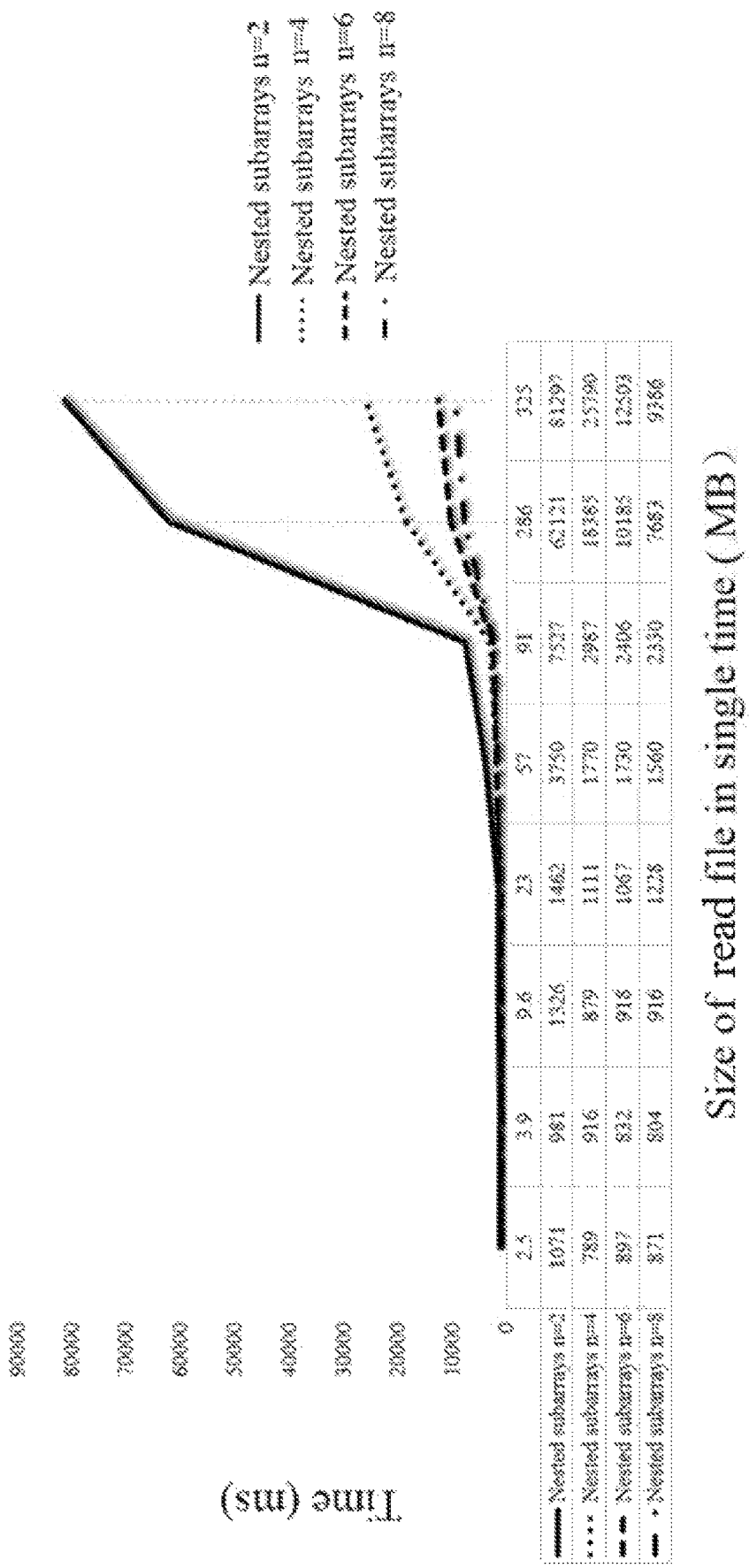
FIG. 13 illustrates an experimental result of read time of a single gz file in a data read-write lake system according to the present disclosure.

FIG. 13 illustrates read time of a single gz file. As can be seen, when the read file reaches 325 Mb, array structures in which 2, 4, 6 and 8 subarrays are nested respectively have read time of 81,297 ms, 25,790 ms, 12,503 ms, and 9,386 ms. Compared with FIG. 5, the read speed in each case is greatly improved over the common data lake system.

From the above, compared with the data lake system in the prior art, the write performance of the data lake system using the data storage method in the present disclosure is slightly improved, and the read performance can be greatly improved. Therefore, the present disclosure can effectively improve the read performance of the data lake. In addition, due to the 8-core experimental environment, the array structure in which 8 subarrays are nested achieves optimal read and write performance, which can be obviously seen from comparison with the array structures in which 2, 4, and 6 subarrays are nested in FIGS. 6-13.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

Although terms such as array, storage layer, file stream, nest and iterator are used extensively herein, the possibility of using other terms is not excluded. The terms are only intended to describe and explain the essence of the present disclosure more conveniently. It is contrary to the spirit of the present disclosure to interpret these terms as any additional limitation.

What is claimed is:

1. A data storage method of a data lake system, comprising the following steps:

S1: converting a file into a file stream;

S2: converting the file stream into an array in which multiple subarrays are nested, a number of the subarrays nested in the array being the same as a number of central processing unit (CPU) cores in a current hardware environment; and S3: converting the array into a resilient distributed dataset (RDD), and storing the RDD to a storage layer of a data lake;

wherein a number of CPU cores in the current hardware environment is acquired by reading a configuration file, thereby dynamically determining a corresponding number of subarrays; and between step S2 and step S3, the data storage method further comprises:

detecting a size of a current array, storing the current array in a single row if an array size is less than or equal to a preset value, and segmenting, if the array size is greater than the preset value, the current array so as to store the current array in multiple rows, the array size on each of the rows being less than or equal to the preset value.

2. The data storage method of a data lake system according to claim 1, wherein when the array size is greater than the preset value, there are n rows, n=m/s+1, wherein m represents the array size, s represents the preset value, and/represents a division operation to obtain a quotient.

3. The data storage method of a data lake system according to claim 2, wherein after segmented into the multiple rows, the array having the size greater than the preset value is returned to an iterator comprising multiple RDDs.

4. The data storage method of a data lake system according to claim 3, further comprising a polling automatic storage method, specifically:

A1: monitoring a file by polling, acquiring absolute paths of all files under a specified path in each round of the polling, and placing the absolute paths into an array to serve as a latest offset;

A2: taking a result in a previous round of the polling, and acquiring a difference set between two arrays; and A3: acquiring an absolute path of a newly increased file in a current round of the polling according to the difference set, and storing the newly increased file to the data lake through steps S1-S3.

5. The data storage method of a data lake system according to claim 4, wherein the method further performs buildReader and prepareWrite on the data lake system by inheriting a FileFormat type, such that the data lake system supports the buildReader and the prepareWrite.

6. A non-transitory computer-readable storage medium storing machine-readable instructions that, when executed by a processor, cause the processor to perform a data storage method, wherein the data storage method comprises the following steps:

S1: converting a file into a file stream;

S2: converting the file stream into an array in which multiple subarrays are nested, a number of the subarrays nested in the array being the same as a number of central processing unit (CPU) cores in a current hardware environment; and S3: converting the array into a resilient distributed dataset (RDD), and storing the RDD to a storage layer of a data lake;

wherein a number of CPU cores in the current hardware environment is acquired by reading a configuration file, thereby dynamically determining a corresponding number of subarrays; and between step S2 and step S3, the data storage method further comprises:

detecting a size of a current array;

storing the current array in a single row if an array size is less than or equal to a preset value; and segmenting, if the array size is greater than the preset value, the current array so as to store the current array in multiple rows, the array size on each of the rows being less than or equal to the preset value.

7. The non-transitory computer-readable storage medium according to claim 6, wherein when the array size is greater than the preset value, there are n rows, n=m/s+1, wherein m represents the array size, s represents the preset value, and/represents a division operation to obtain a quotient.

8. The non-transitory computer-readable storage medium according to claim 7, wherein after segmented into the multiple rows, the array having the size greater than the preset value is returned to an iterator comprising multiple RDDs.

9. The non-transitory computer-readable storage medium according to claim 8, wherein the data storage method further comprises a polling automatic storage method, specifically:

A1: monitoring a file by polling, acquiring absolute paths of all files under a specified path in each round of the polling, and placing the absolute paths into an array to serve as a latest offset;

A2: taking a result in a previous round of the polling, and acquiring a difference set between two arrays; and A3: acquiring an absolute path of a newly increased file in a current round of the polling according to the difference set, and storing the newly increased file to the data lake through steps S1-S3.

10. The non-transitory computer-readable storage medium according to claim 9, wherein the data storage method further performs buildReader and prepareWrite on the non-transitory computer-readable storage medium by inheriting a FileFormat type, such that the non-transitory computer-readable storage medium supports the buildReader and the prepare Write.

* * * * *